United States Patent Office 2,842,432
Patented July 8, 1958

2,842,432

SUPPLEMENTARY FUEL MIXTURE FOR COLD STARTING DIESEL ENGINES

Stanley R. Newman, Fishkill, and Herbert E. Vermillion, Wappingers Falls, N. Y., assignors to The Texas Company, New York, N. Y., a corporation of Delaware No Drawing. Application December 7, 1953
Serial No. 396,786

4 Claims. (Cl. 44—53)

This invention relates to a supplementary fuel mixture for cold starting diesel engines. More particularly, this invention discloses an improved supplementary fuel mixture for initiating combustion in diesel engines at sub-freezing temperatures.

In recent years, the problem of starting diesel engines at sub-freezing temperatures has been accentuated by the establishment of arctic military bases vital to the national defense.

In general, two procedures have been advanced to solve the problem of cold starting of diesel engines. One procedure has involved the use of a special starting-up fuel comprising a diesel oil fraction plus various aliphatic ethers such as diethyl ether, diethyl Carbitol and diethyl Cellosolve. A major drawback of this type procedure has been the necessity of supplying a special fuel tank and means for introducing the special fuel into the combustion chamber of the diesel engine. The other approach to the problem of cold starting has involved the manifold injection of dialiphatic ethers, for example, diethyl ether, in combination with the injection of regular diesel fuel into the combustion zone. Manifold injection of diethyl ether in combination with the use of a regular diesel fuel has the serious drawback that severe combustion shock is encountered and engine wear is noticeably increased. The supplementary fuel mixture of this invention effects cold starting of diesel engines in a much shorter period of time than has been possible with previous fuels and, in addition, is satisfactory from the standpoint of combustion shock and engine wear.

This invention is a continuation-in-part of our copending application Serial No. 377,239, filed August 28, 1953, now U. S. Patent No. 2,774,656, which discloses supplementary fuel mixtures for cold starting diesel engines by manifold injection of a mixture comprising 2 to 50 percent dialiphatic ether and 50 to 98 percent dialiphatic glycol ether. In the instant invention, cold starting of diesel engines is effected by manifold injection of a mixture comprising a 1,1-dialkoxy alkane and an ether.

In accordance with the invention, diesel engines are started at sub-freezing temperatures by using regular diesel fuel in the main injector, while a mixture of 1,1-dialkoxy alkane and an ether selected from the group consisting of dialiphatic ethers, dialiphatic glycol ethers and mixtures thereof is introduced into the air manifold. The 1,1-dialkoxy alkane component which may also be called an acetal comprises 10 to 90 percent of the total mixture and has the general formula

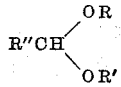

wherein R and R' are aliphatic hydrocarbon radicals containing 1 to 4 carbon atoms and R" is a hydrogen atom or an aliphatic hydrocarbon radical containing 1 to 4 carbon atoms. The remainder of the air manifold injected mixture is a dialiphatic ether of the general formula ROR' or a dialiphatic glycol ether of the general formula RO(CH$_2$CH$_2$O)$_n$R' or mixtures thereof. In both of these formulae, R and R' also represent aliphatic radicals containing 1 to 4 carbon atoms; n is an integer having a value of 1 to 4. Preferred fuels for use in the process of the invention are the following mixtures: diethoxy methane-diethyl ether; diethoxy methane-diethyl Cellosolve; diethoxy methane-diethyl Carbitol. Diethyl Cellosolve and diethyl Carbitol are commercial products manufactured and sold by Carbide and Carbon Chemicals Corporation, and identified on page 5 of their booklet entitled, "Ethers and Oxides," copyright 1945, as ethylene glycol diethyl ether and diethylene glycol diethyl ether, respectively.

A particularly advantageous feature of this invention is that the manifold introduction of the mixture of ether and dialiphatic glycol ether does not require special apparatus. A Bosch injector specifically designed for spraying fuels into the intake manifold has been used with excellent results, but even better performance has been realized by injecting the special fuel into the intake manifold manually with a pump-type oil can, a Flit gun or an aerosol bomb. The excellent results obtained with manual injection using an oil can or Flit gun prove that the cold starting fuel mixture of the invention is independent of the state of sub-division of the introduced fuel and is a direct function of its composition.

The fact that the invention appears to be independent of the mode of introduction into the manifold eliminates the necessity of installing an extra fuel tank and a spray injector in order to practice the invention. Manual introduction of the acetal-ether blend by means of a pump-type oil can, a Flit gun or a Kelite gun is simply practiced without the need for installing extra equipment on each engine.

An outstanding advantage of cold starting diesel engines by manifold introduction of an acetal-ether blend is its freedom from combustion shock and excess engine wear. The blend is entirely satisfactory from the standpoint of both lubrication and corrosion. Even after many cold starting runs with manifold introduction of an acetal-ether blend, an overhauled engine shows negligible wear and the valves, bearings, pistons and rings are almost like new although the oil temperature never rises above about −20° F. The excellent performance of acetal-ether blends in effecting cold starting of diesel engines contrasts sharply with manifold introduction of ether which is accompanied by excessive engine wear and severe combustion shock.

The 1,1-dialkoxy alkane or acetal component of the mixture is represented by the general formula

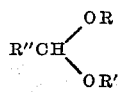

wherein R and R' are aliphatic groups which may be either alkyl or alkenyl groups containing up to 4 carbon atoms and R" is hydrogen or an aliphatic hydrocarbon group containing up to 4 carbon atoms; the R and R' may be identical or different alkyl or alkenyl groups. Examples of acetals which can be used in the process of the invention are diethoxy methane, 1,1-diethoxy ethane, n-dibutoxy methane, 1,1-dimethoxy butane and di-2-n-butenoxy methane. Diethoxy methane is preferred for use in the manifold injected mixture because of its availability and because optimum results are obtained therewith.

In the general formula ROR' for the dialiphatic ether component of the manifold introduced mixture, R and R' represent the same groups as in the general formula for the acetal component of the introduced mixture.

Examples of aliphatic ethers which can be used in the process of the invention are diethyl ether, dimethyl ether, di-isobutyl ether, methyl n-propyl ether and ethyl isopropyl ether. Diethyl ether is a preferred dialiphatic ether.

In the general formula $RO(CH_2CH_2O)_nR'$ for the dialiphatic glycol ether, $n$ is 1 to 4, and R and R' represent the same radicals as in the acetal general formula, that is, they are alkyl or alkenyl groups having 1 to 4 carbon atoms. Glycol ethers from which the manifold introduced mixture is prepared are exemplified by diethyl Cellosolve, $C_2H_5OC_2H_4OC_2H_5$, diethyl Carbitol, $C_2H_5OC_2H_4OC_2H_4OC_2H_5$, di-isopropyl Cellosolve, $C_3H_7OC_2H_4OC_3H_7$, ethyl propenyl Carbitol, $$C_2H_5OC_2H_4OC_2H_4OC_3H_5$$

di-n-butyl Cellosolve, $C_4H_9OC_2H_4OC_4H_9$ and diethyl tetraglycol, $C_2H_5O(C_2H_4O)_4C_2H_5$. Diethyl Carbitol and diethyl Cellosolve are the preferred glycol ethers for formulating mixtures used in this invention.

The composition of the acetal-ether blend is within the limits of 10 to 90 percent acetal and 90 to 10 percent ether. With diethoxy methane-diethyl ether, diethoxy methane-diethyl Cellosolve, and diethoxy methane-diethyl Carbitol mixtures, optimum results are obtained with a mixture containing between about 50 and 80 percent acetal and 20 to 50 percent ether. Although the preferred composition varies with the particular acetal and ether components of the introduced fuel mixture, in general it can be stated that best results are obtained with mixtures wherein the acetal component constitutes the major portion of the mixture.

The process of the invention for cold starting diesel engines was evaluated in a single cylinder Fairbanks-Morse diesel engine model 45-B, which was installed in a cold room maintained at —25° F. and below. As a diesel fuel, there was used a Texas Company product sold as Crystalite having an IBP-minimum of 325° F. and an EP-maximum of 525° F. Manifold introduction of the acetal-ether mixture was effected manually with an OC5-snap-on-pump oiler, a Flit gun and a Kelite gun.

The effectiveness of the supplementary fuel mixtures of the invention in cold starting diesel engines was determined in terms of the average starting time in minutes required to initiate operation of the test Fairbanks-Morse engine. In the following table, there are shown results obtained when cold starting a Fairbanks-Morse engine at —25° F. and below by manifold injection of acetal-ether mixtures in comparison with manifold injection of ether, dialiphatic glycol ether and acetal separately and with the use of various cold starting fuel blends.

The above data clearly demonstrate the effectiveness of the supplementary fuel mixtures of the invention for cold starting diesel engines. Run 1 shows that a diesel engine cannot be started using a standard diesel fuel at —30° F. Runs 2 and 3 show the results obtained with the use of special cold starting fuels comprising a mixture of dialiphatic glycol ethers and hydrocarbon fractions; it is noteworthy that average starting times of over 2½ minutes were required. Runs 4 to 6 illustrate the use of manifold introduction of individual ethers in conjunction with the use of regular diesel fuels in cold starting; the best results were obtained by manifold introduction of diethyl Cellosolve with which cold starting was effected in 0.9 minute; with manifold introduction of diethyl ether and diethyl Carbitol separately, average starting times of 1.67 and 2.2 minutes, respectively, were required. Run 7 shows cold starting employing manifold injection of diethoxy methane. Runs 8 to 12 illustrate cold starting with the supplementary fuel mixtures of this invention.

It is noteworthy that the average starting times obtained using mixtures of an acetal and an ether are substantially shorter than any of the runs using known starting fuels. The synergistic action of the acetal-ether and acetal-glycol ether blends is clearly demonstrated in this table since the average starting times obtained with the blends are much shorter than either of the components separately. It is also noteworthy that excellent results are obtained regardless of the mode of injection of the acetal-ether and acetal-glycol ether blends. The absolute independence of the invention from equipment limitations is unusual and proves that it is not dependent on the fineness of the spray of manifold injected fuel.

Obviously, many modifications and variations of the invention, as hereinbefore set forth, may be made without departing from the spirit and scope thereof, and, therefore, only such limitations should be imposed as are indicated in the appended claims.

We claim:
1. A supplementary fuel mixture designed for cold starting diesel engines by manifold introduction consisting essentially of from 20 to 80 percent by volume of diethoxy methane and from 80 to 20 percent by volume of a compound selected from the group consisting of diethyl ether, ethylene glycol diethyl ether, diethylene glycol diethyl ether, and mixtures thereof.

2. A supplementary fuel according to claim 1 consisting essentially of 50 to 80 percent diethoxy methane and 50 to 20 percent diethyl ether.

3. A supplementary fuel according to claim 1 consisting essentially of 50 to 80 percent diethoxy methane and 50 to 20 percent ethylene glycol diethyl ether.

| | Fuel | Manifold Introduced Fuel | Means of Manifold Introduction | Temperature, °F. | Average Starting Time, Min. |
|---|---|---|---|---|---|
| 1 | Crystalite | None | | —30 | No start |
| 2 | 50-50 Diethyl Carbitol-Crystalite | do | | —30 | 2.48 |
| 3 | 50-50 Diethyl Carbitol-Stoddard Solvent | do | | —30 | 2.33 |
| 4 | Crystalite | Diethyl Carbitol | Flit gun | —30 | 2.20 |
| 5 | do | Diethyl Cellosolve | do | —30 | 0.90 |
| 6 | do | Diethyl Ether | do | —30 | [1] 1.67 |
| 7 | do | 100% Diethoxy Methane | Modified Kelite gun | —30 | 1.301 |
| 8 | do | 50% Diethyl Cellosolve in Diethoxy Methane | Flit gun | —30 | 0.581 |
| 9 | do | 50% Diethyl Carbitol in Diethoxy Methane | do | —30 | 0.595 |
| 10 | do | 20% Diethyl Ether in Diethoxy Methane | Pump oiler | —30 | 0.380 |
| 11 | do | 20% Diethoxy Methane in Diethyl Carbitol | do | —30 | 0.762 |
| 12 | do | 33⅓% Diethyl Carbitol, 33⅓% Diethyl Cellosolve, 33⅓% Diethoxy Methane | Flit gun | —31 | 0.736 |

[1] Value average of individual readings of from 0.55 min. to 3.31 min.

4. A supplementary fuel according to claim 1 consisting essentially of 50 to 80 percent diethoxy methane and 50 to 20 percent diethylene glycol diethyl ether.

References Cited in the file of this patent

UNITED STATES PATENTS

| | | |
|---|---|---|
| 1,582,420 | Nikaido | Apr. 27, 1926 |
| 2,221,839 | Lipkin | Nov. 19, 1940 |
| 2,364,356 | Greathouse | Dec. 5, 1944 |
| 2,431,322 | Goodale | Nov. 25, 1947 |
| 2,516,787 | Moody | July 25, 1950 |
| 2,575,543 | Young | Nov. 20, 1951 |
| 2,655,440 | Barusch et al. | Oct. 13, 1953 |
| 2,658,490 | Bevis et al. | Nov. 10, 1953 |

FOREIGN PATENTS

| | | |
|---|---|---|
| 868,233 | France | Dec. 24, 1941 |

OTHER REFERENCES

"Handbook of Chemistry and Physics," 16th edition, Chemical Rubber Publishing Co., Cleveland, Ohio, 1931, page 310.